United States Patent
Kobayashi et al.

(10) Patent No.: US 9,060,140 B2
(45) Date of Patent: Jun. 16, 2015

(54) MICROLENS ARRAY UNIT AND SOLID STATE IMAGING DEVICE

(71) Applicant: Kabushiki Kaisha Toshiba, Minato-ku (JP)

(72) Inventors: Mitsuyoshi Kobayashi, Tokyo (JP); Risako Ueno, Tokyo (JP); Kazuhiro Suzuki, Tokyo (JP); Hiroto Honda, Yokohama (JP); Honam Kwon, Kawasaki (JP); Hideyuki Funaki, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/165,925

(22) Filed: Jan. 28, 2014

(65) Prior Publication Data
US 2014/0285693 A1 Sep. 25, 2014

(30) Foreign Application Priority Data
Mar. 19, 2013 (JP) .................................. 2013-057093

(51) Int. Cl.
| H04N 5/225 | (2006.01) |
| G02B 13/16 | (2006.01) |
| H04N 5/335 | (2011.01) |
| G02B 13/00 | (2006.01) |

(Continued)

(52) U.S. Cl.
CPC ............ *H04N 5/335* (2013.01); *G02B 13/0085* (2013.01); *G02B 3/0043* (2013.01); *H04N 5/232* (2013.01); *G02B 3/0062* (2013.01); *G02B 3/0068* (2013.01)

(58) Field of Classification Search
USPC ......................................................... 348/335
See application file for complete search history.

(56) References Cited

U.S. PATENT DOCUMENTS

| 8,675,118 | B2 * | 3/2014 | Ryu .............................. 348/340 |
| 2008/0112635 | A1 | 5/2008 | Kondo et al. |
| 2009/0200623 | A1 * | 8/2009 | Qian et al. .................... 257/432 |

(Continued)

FOREIGN PATENT DOCUMENTS

| JP | 2012-186764 | 9/2012 |
| JP | 2013-145897 | 7/2013 |

OTHER PUBLICATIONS

U.S. Appl. No. 14/162,122, filed Jan. 23, 2014, Risako Ueno et al.

(Continued)

*Primary Examiner* — Anthony J Daniels
(74) *Attorney, Agent, or Firm* — Oblon, McClelland, Maier & Neustadt, L.L.P.

(57) ABSTRACT

A microlens array unit according to an embodiment includes: a substrate; a first group of microlenses including first microlenses having a convex shape and a first focal length, the first group of microlenses being arranged on the substrate; and a second group of microlenses including second microlenses having a convex shape and a second focal length different from the first focal length, the second group of microlenses being arranged on the substrate, a first imaging plane of the first group of microlenses and a second imaging plane of the second group of microlenses being parallel to each other, a distance between the first and second imaging planes in a direction perpendicular to the first imaging plane being 20% or less of the first focal length, and images of the first microlenses projected on the substrate not overlapping images of the second microlenses projected on the substrate.

18 Claims, 20 Drawing Sheets

(51) Int. Cl.
*G02B 3/00* (2006.01)
*H04N 5/232* (2006.01)

(56) References Cited

U.S. PATENT DOCUMENTS

| | | | |
|---|---|---|---|
| 2010/0021167 A1* | 1/2010 | Aota et al. | 398/79 |
| 2011/0122308 A1 | 5/2011 | Duparre | |
| 2012/0050589 A1 | 3/2012 | Ueno et al. | |
| 2012/0057020 A1 | 3/2012 | Kobayashi et al. | |
| 2012/0062771 A1 | 3/2012 | Ueno et al. | |
| 2012/0218448 A1 | 8/2012 | Ueno et al. | |
| 2012/0218454 A1* | 8/2012 | Suzuki et al. | 348/335 |
| 2012/0229683 A1 | 9/2012 | Kobayashi et al. | |
| 2013/0075585 A1 | 3/2013 | Kobayashi et al. | |
| 2013/0075586 A1 | 3/2013 | Ueno et al. | |
| 2013/0075587 A1 | 3/2013 | Suzuki et al. | |
| 2013/0075849 A1 | 3/2013 | Suzuki et al. | |
| 2013/0128092 A1 | 5/2013 | Ogasahara et al. | |
| 2013/0240709 A1 | 9/2013 | Ueno et al. | |
| 2013/0242161 A1 | 9/2013 | Kobayashi et al. | |
| 2013/0308197 A1 | 11/2013 | Duparre | |
| 2014/0240559 A1 | 8/2014 | Ueno et al. | |
| 2014/0284746 A1 | 9/2014 | Suzuki et al. | |
| 2014/0285703 A1 | 9/2014 | Kizu et al. | |
| 2014/0285708 A1 | 9/2014 | Kwon et al. | |

OTHER PUBLICATIONS

U.S. Appl. No. 13/827,237, filed Mar. 14, 2013, Kazuhiro Suzuki et al.
T. Georgiev et al. "Reducing Plenoptic Camera Artifacts", Computer Graphics Forum, vol. 29, No. 6, 2010, 14 pages.
The Extended European Search Report issued Jul. 18, 2014, in Application No. / Patent No. 14156126.6-1562.
Todor Georgiev, et al., "Using Focused Plenoptic Cameras for Rich Image Capture", IEEE Computer Graphics and Applications, IEEE Service Center, vol. 31, No. 1, XP011341207, Jan. 1, 2011, pp. 62-73.

* cited by examiner

MICROLENS ARRAY UNIT AND SOLID STATE IMAGING DEVICE

CROSS REFERENCE TO RELATED APPLICATIONS

This application is based upon and claims the benefit of priority from prior Japanese Patent Application No. 2013-057093 filed on Mar. 19, 2013 in Japan, the entire contents of which are incorporated herein by reference.

FIELD

Embodiments described herein relate generally to a microlens array unit and a solid state imaging device.

BACKGROUND

Various techniques such as a technique using a reference light and a stereo ranging technique using a plurality of cameras are known as imaging techniques for obtaining a depth-direction distance to a subject, serving as two-dimensional array information. In particular, in recent years, imaging devices capable of obtaining distance information at relatively low costs have been increasingly needed to serve as newly developed consumer input devices.

An example of distance imaging methods that do not use any reference light in order to save system costs is a triangulation method using parallaxes. Stereo cameras and compound-eye cameras are known as devices using such a method. These cameras, however, each use two or more camera elements, which causes such problems as an increase in the size of the systems, and an increase in failure rate caused by an increase in the number of system components.

A known structure of imaging devices capable of obtaining distance information has a microlens array arranged above pixels, so that a few pixels are located below a corresponding microlens. With such a structure, images with parallaxes can be obtained in the units of pixel blocks. The parallaxes make it possible to estimate the distance to a subject, and to perform re-focusing based on such distance information.

If a microlens array is formed of microlenses of the same type having the same focal length, the magnification of a reconstructed image is determined based on the distance to the subject. For this reason, it is not possible to obtain, using such a microlens array, an image formed with another magnification for the same distance to the subject. In order to vary reconstruction magnification, a voice coil motor or actuator should be equipped to the imaging device.

DETAILED DESCRIPTION

A microlens array unit according to an embodiment includes: a substrate; a first group of microlenses including first microlenses having a convex shape and a first focal length, the first group of microlenses being arranged on the substrate; and a second group of microlenses including second microlenses having a convex shape and a second focal length that is different from the first focal length, the second group of microlenses being arranged on the substrate, a first imaging plane of the first group of microlenses and a second imaging plane of the second group of microlenses being parallel to each other, a distance between the first imaging plane and the second imaging plane in a direction perpendicular to the first imaging plane being 20% or less of the first focal length, and images of the first microlenses projected on the substrate not overlapping images of the second microlenses projected on the substrate.

Embodiments will now be explained with reference to the accompanying drawings.

How the present inventors have reached the present invention will be described before the embodiments of the present invention will be described. Some imaging devices have an optical structure capable of obtaining distance information and a re-focusing effect, in which a microlens array is arranged above pixels so that some pixels are located below each microlens. In such imaging devices, the resolution of a reconstructed image abruptly changes depending on the distance to the subject. As a result, if there are two or more subjects each having a different distance to the imaging device, a reconstructed image with a low resolution may be obtained for some subjects that are not in focus for the distance selected. On the contrary, an imaging device having an optical structure capable of obtaining a reconstructed image with a high resolution for all subjects is not capable of having a re-focusing effect easily. The present inventors considered that if the aforementioned drawbacks are solved, and a high resolution image and an image with a re-focusing effect can be obtained simultaneously, the field to which such techniques using cameras are applied may be widened and the convenience of camera users may be improved. In the following embodiments, a microlens array and a solid-state imaging element capable of obtaining a high-resolution image and an image with a re-focusing effect, and an imaging device using such elements will be proposed.

First Embodiment

Figure 1:
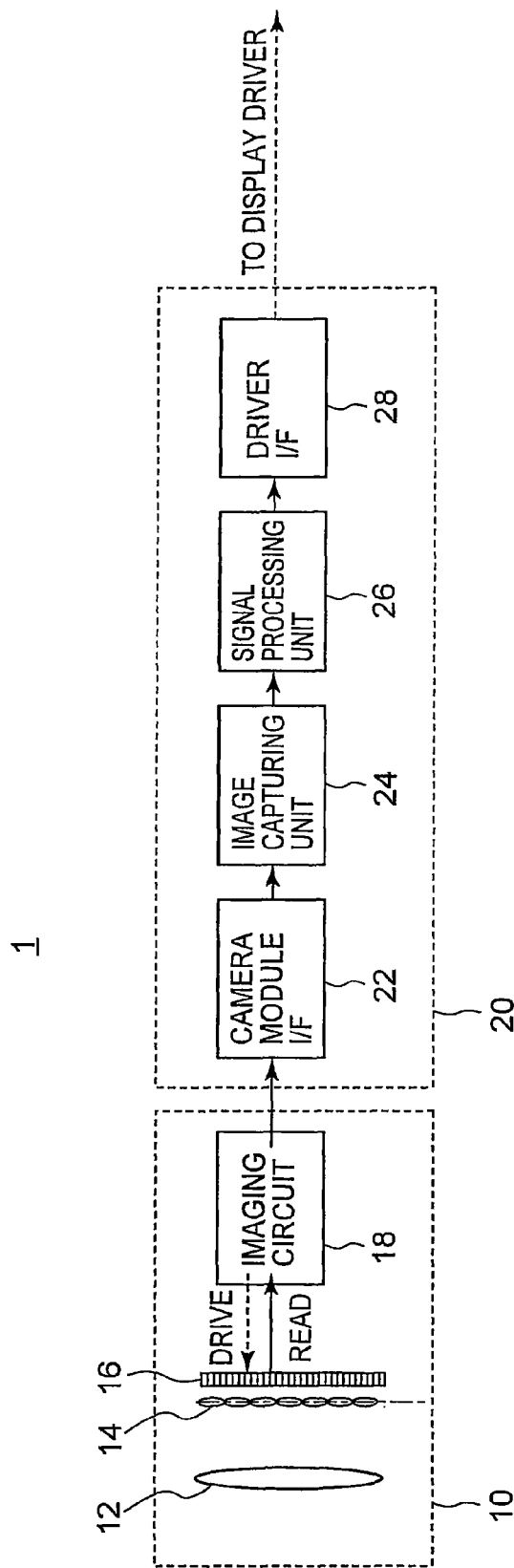
FIG. 1 is a diagram showing a solid state imaging device according to a first embodiment.

FIG. 1 shows a solid state imaging device (hereinafter also referred to as the "camera module") 1 according to the first embodiment. The solid state imaging device 1 according to the first embodiment includes an imaging module unit 10 and an imaging signal processor (hereinafter also referred to as the "ISP") 20.

The imaging module unit 10 includes an imaging optics 12, a microlens array 14, an imaging element 16, and an imaging circuit 18. The imaging optics 12 functions as an image capturing optical system to capture light from a subject and transfer it into the imaging element 16. The imaging element 16 functions as an element for converting the light captured by the imaging optics 12 to signal charges, and includes a plurality of pixels (for example, photodiodes serving as photoelectric conversion elements) arranged in a two-dimensional array form. The microlens array 14 includes microlenses.

The optical system of this embodiment functions as a system for reducing and re-forming images on pixel blocks corresponding to respective microlenses of the microlens array 14 from light rays that are focused on an image plane by the imaging optics 12. The imaging circuit 18 includes a drive circuit unit (not shown) that drives the respective pixels of the pixel array of the imaging element 16, and a pixel signal processing circuit unit (not shown) that processes signals outputted from the pixel region. The drive circuit unit and the pixel signal processing circuit unit may be combined with each other to form a drive and processing circuit. In the embodiments described below, the imaging circuit 18 includes a drive and processing circuit. The drive circuit unit includes, for example, a vertical selection circuit that sequentially selects pixels to be driven in a vertical direction in units of horizontal line (row), a horizontal selection circuit that sequentially selects pixels to be driven in units of column, and a timing generator (TG) circuit that drives the selection circuits with several types of pulses. The pixel signal processing circuit unit includes such circuits as an analog-to-digital conversion circuit that converts analog electric signals from the pixel region to digital signals, a gain adjustment and amplifier circuit that performs gain adjustment and amplifying operations, and a digital signal processing circuit that corrects the digital signals.

The ISP 20 includes a camera module interface (I/F) 22, an image capturing unit 24, a signal processing unit 26, and a driver I/F 28. A RAW image obtained by an imaging operation performed by the imaging module unit 10 is captured through the camera module I/F 22 into the image capturing unit 24. The signal processing unit 26 performs a signal processing operation on the RAW image captured into the image capturing unit 24. The driver I/F 28 outputs, to a display driver that is not shown, image signals having been subjected to the signal processing operation at the signal processing unit 26. The display driver displays the image formed by the solid state imaging device.

(Details of Optical System)

Figure 2:
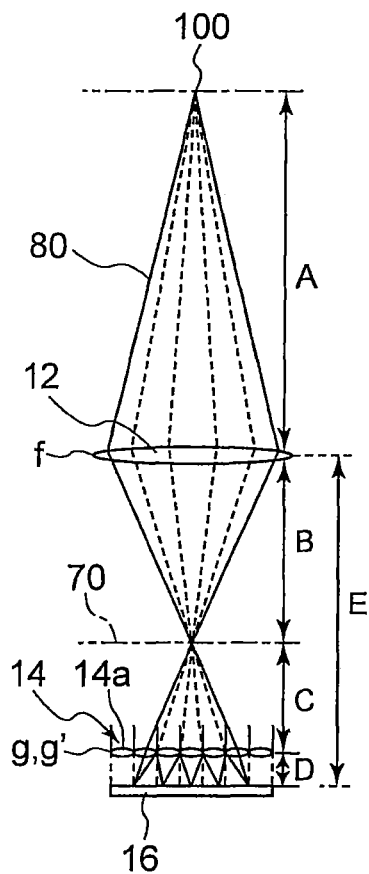
FIG. 2 is a diagram showing an example of the optical system of the solid state imaging device according to the first embodiment.

FIG. 2 shows an optical system of a solid state imaging device according to the first embodiment. It is assumed here that the imaging optics 12 includes only one imaging lens. Actually, the imaging optics 12 may include a plurality of imaging lenses. Light rays 80 from a subject 100 are incident on the imaging lens (imaging optics) 12, which forms an image on an imaging plane 70. The image formed on the imaging plane 70 is then incident on the microlens array 14, and reduced and re-imaged on the imaging element 16 by means of microlenses 14a constituting the microlens array 14. In FIG. 2, A denotes the distance between the imaging lens 12 and the subject 100, B denotes the imaging distance of the imaging lens 12, C denotes the distance between the imaging plane 70 of the imaging lens 12 and the microlens array 14, and D denotes the distance between the microlens array 14 and the imaging element 16. In the following descriptions, f denotes the focal length of the imaging lens 12, and g and g' each denote the focal length of the microlens 14a.

Herein, for easy explanation, the subject 100 side relative to a plane passing through the center of the imaging lens 12 and perpendicular to the optical axis is defined as the front side, and the imaging element 16 side is defined as the back side. In the optical system, the microlens array 14 has a role of dividing the light rays from the imaging lens 12 into images of respective visual points, which are formed on the imaging element 16.

Figure 3:
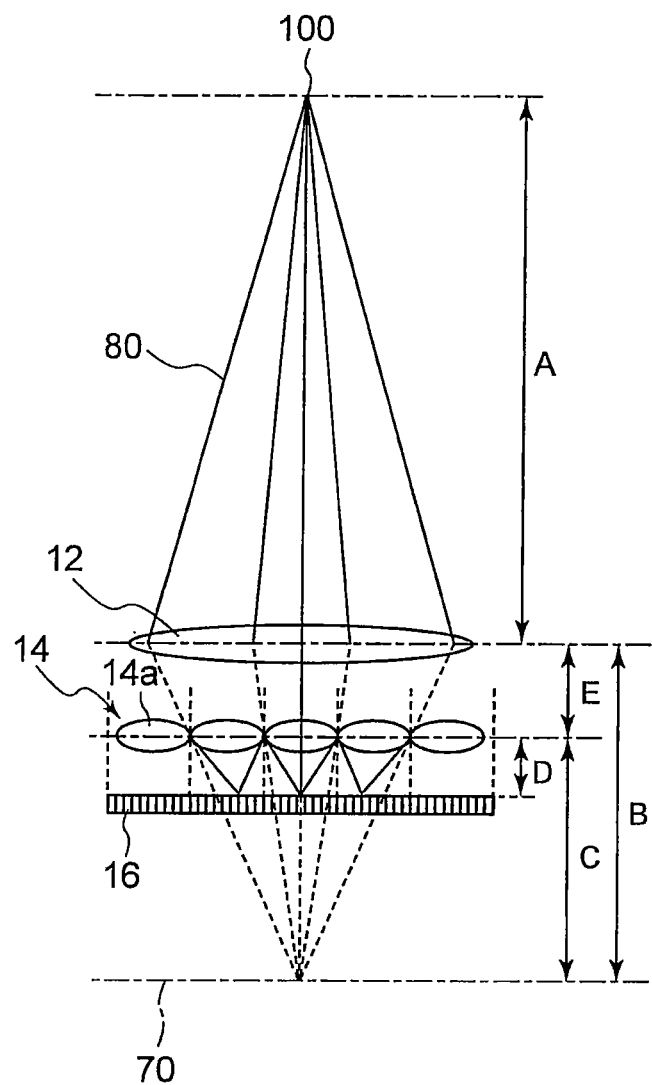
FIG. 3 is a diagram showing another example of the optical system of the solid state imaging device according to the first embodiment.

As shown in FIG. 2, the microlens array 14 of the solid state imaging device according to the first embodiment is arranged after the imaging plane 70 of the imaging lens 12, when viewed from the imaging lens 12. However, the optical system of the first embodiment is not limited to the one shown in FIG. 2. For example, as shown in FIG. 3, the microlens array 14 may be arranged before the imaging plane 70 of the imaging lens 12.

(Details of Microlens Array)

The microlens array (hereinafter also referred to as the "microlens array unit") 14 of the solid state imaging device according to the first embodiment will be described below with reference to FIGS. 4 to 6.

First Specific Example

Figure 4:
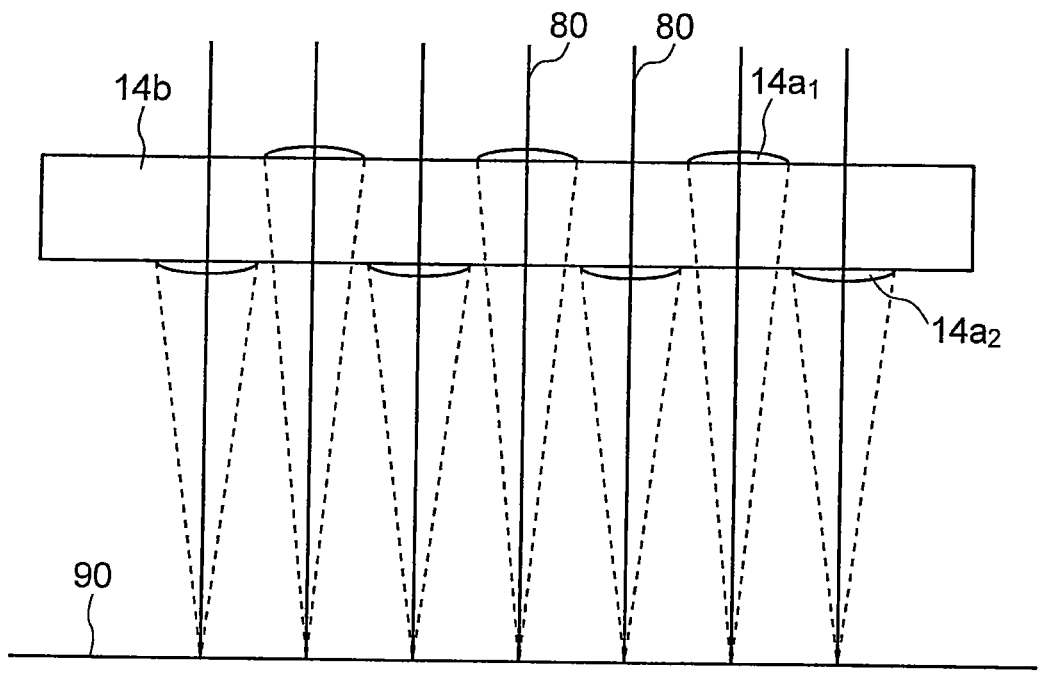
FIG. 4 is a diagram showing a first specific example of the microlens array.

FIG. 4 shows a first specific example of the microlens array 14. The microlens array 14 of the first specific example includes a substrate 14b and two groups of convex microlenses $14a_1$, $14a_2$ that are arranged on opposite surfaces of the substrate 14b, which is transparent, each group having a different focal length. Specifically, the group of microlenses $14a_1$ is located on one (first surface) of the two opposite surfaces of the substrate 14b, and the group of microlenses $14a_2$ is located on the other surface (second surface) of the substrate 14b. The focal length of the group of microlenses $14a_1$ is longer than that of the group of microlenses $14a_2$. The focal length of the group of microlenses $14a_1$ will be called "first focal length." The focal length of the group of microlenses $14a_2$ will be called "second focal length." The microlens array 14 is configured such that the two groups of microlenses $14a_1$, $14a_2$ form images on the same imaging plane 90. Thus, light rays 80 incident on the group of microlenses $14a_1$ and the group of microlenses $14a_2$ form images on the same imaging plane 90. In other words, the imaging plane (first imaging plane) of the first group of microlenses $14a_1$ is the same as the imaging plane (second imaging plane) of the second group of microlenses $14a_2$. Alternatively, the first imaging plane and the second imaging plane may be different from and parallel to each other, and the distance between the first imaging plane and the second imaging plane in a direction perpendicular to the first imaging plane may be 20% or less, preferably 10% or less, of the first focal length. Even if the first imaging plane and the second imaging plane are intended to be at the same location, they may be displaced from each other for such reasons as manufacturing errors. However, if the error is within the range of 20% or less, the function of the solid-state imaging element can be maintained.

The groups of microlenses $14a_1$, $14a_2$ are arranged on the substrate 14b in such a manner that the images projected by the group of microlenses $14a_1$ onto a plane parallel to the first surface of the substrate 14b do not overlap the images projected by the group of microlenses $14a_2$ onto a plane parallel to the first surface of the substrate 14b. The microlenses in each group of microlenses $14a_1$, $14a_2$ are arranged so that the projected images are in a square arrangement or hexagonal arrangement. The imaging plane 90 is on the top surface of the imaging element. Thus, the imaging element 16 faces the second surface of the substrate 14b.

Incidentally, the term "convex" means projecting relative to the surface of the substrate 14b, on which the group of microlens is located, and the term "concave" means being depressed relative to such a surface.

The microlens array 14 is, for example, transmissive to light, and for example, transparent. The substrate 14b is formed of, for example, glass or resin. The groups of microlenses $14a_1$, $14a_2$ are formed of resin, for example.

Like the first specific example, each of the specific examples described below has a first imaging plane and a second imaging plane that are parallel to each other, the distance between the first imaging plane and the second imaging plane in a direction perpendicular to the first imaging plane being 20% or less, preferably 10% or less, of the first focal length. The microlenses of the first group of microlenses $14a_1$ and the second group of microlenses $14a_2$ are arranged so that the images thereof projected on the substrate 14b do not overlap each other.

Second Specific Example

Figure 5:
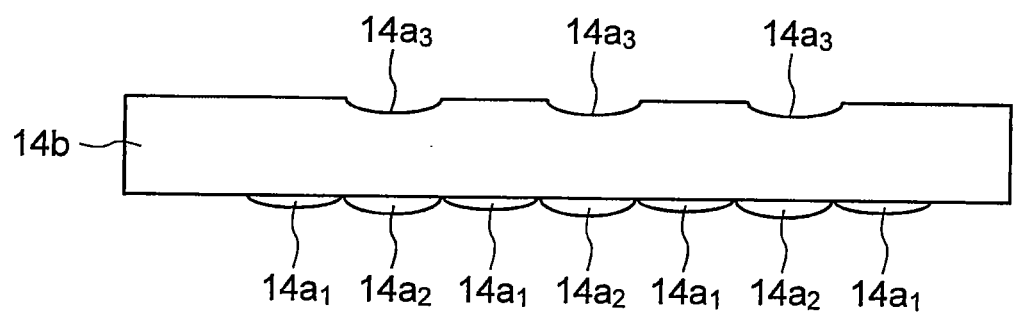
FIG. 5 is a diagram showing a second specific example of the microlens array.

FIG. 5 shows a second specific example of the microlens array 14. The microlens array 14 of the second specific example includes two groups of convex microlenses $14a_1$, $14a_2$, each group having a different focal length. These microlenses are alternately arranged on one surface of the substrate 14b, which is transparent. The microlens array 14 of the second specific example further includes a group of concave microlenses $14a_3$ arranged on the other surface of the substrate 14b at locations corresponding to the respective microlenses $14a_2$ having a shorter focal length. Each convex microlens of the group of microlenses $14a_2$ is combined with a concave microlens of the group of microlenses $14a_3$ to form one shorter-focal-length microlens. An optical system including a combination of a convex lens and a concave lens can be replaced with an optical system in which a virtual lens is placed at the principal point of a lens. In such a case, the virtual lens is not necessarily located on the microlens substrate, but can be located outside the microlens substrate. This improves the degree of freedom in the microlens focal length. If a concave lens is located on the subject side, and a convex lens is located on the imaging element side, the principal point can be located on the imaging element side relative to the microlens substrate. On the contrary, if a convex lens is located on the subject side, and a concave lens is located on the imaging element side, the principal point can be located to the subject side.

As in the case of the first specific example, the group of microlenses $14a_1$ having a longer focal length of the microlens array 14 of the second specific example form images on the same imaging plane (not shown) as the group of microlenses $14a_2$, $14a_3$ having a shorter focal length.

Third Specific Example

Figure 6:
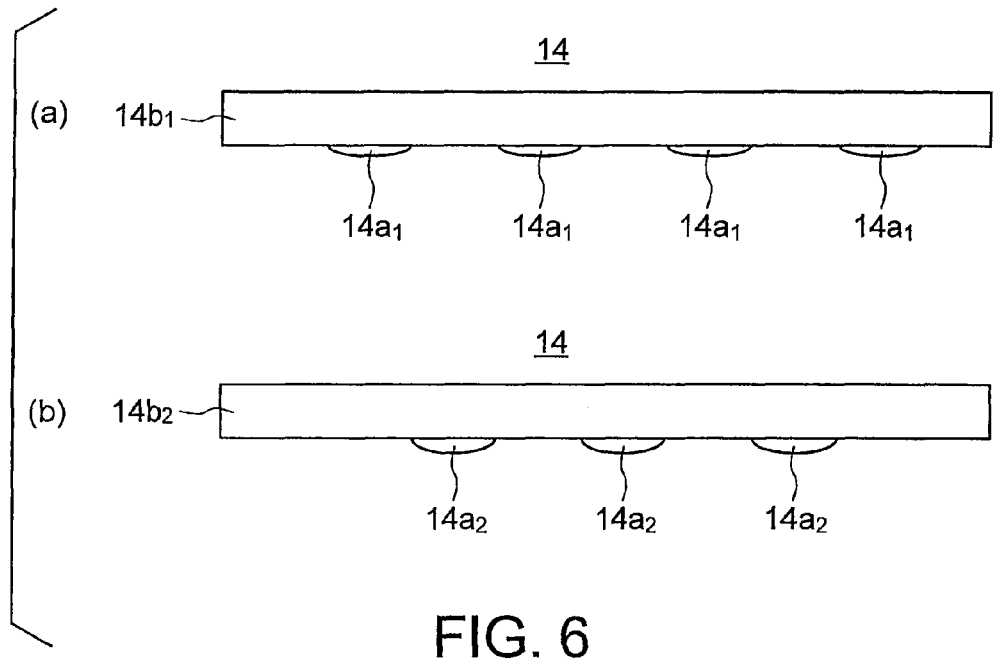
FIGS. 6(a) and 6(b) are diagrams showing a third specific example of the microlens array.

FIG. 6 shows a third specific example of the microlens array 14. The microlens array 14 of the third specific example includes two or more transparent substrates $14b_1$, $14b_2$ arranged in parallel. Groups of convex microlenses $14a_1$, $14a_2$ are arranged on respective surfaces of the substrates $14b_1$, $14b_2$ on the side where the imaging element, which is not shown, is located. Specifically, the group of microlenses $14a_1$ having a longer focal length is arranged on the substrate $14b_1$ that is more distant from the imaging element, and the group of microlenses $14a_2$ having a shorter focal length is arranged on the substrate $14b_2$ that is closer to the imaging element. The microlenses in the group of microlenses $14a_1$ are spaced apart from each other and arranged on the substrate $14b_1$, and the microlenses in the group of microlenses $14a_2$ are also spaced apart from each other and arranged on the substrate $14b_2$. The substrates $14b_1$, $14b_2$ and the groups of microlenses $14a_1$, $14a_2$ are arranged in such a manner that, when the microlenses $14a_2$ are projected on the substrate $14b_1$, the projected images of the microlenses $14a_2$ do not overlap the microlenses $14a_1$. The substrate $14b_1$ and the group of microlenses $14a_1$ constitute a first microlens sub-array, and the substrate $14b_2$ and the group of microlenses $14a_2$ constitute a second microlens sub-array.

As in the case of the first specific example, the group of microlenses $14a_1$ having a longer focal length of the microlens array 14 of the third specific example form images on the same imaging plane (not shown) as the group of microlenses $14a_2$ having a shorter focal length.

Fourth Specific Example

Figure 7:
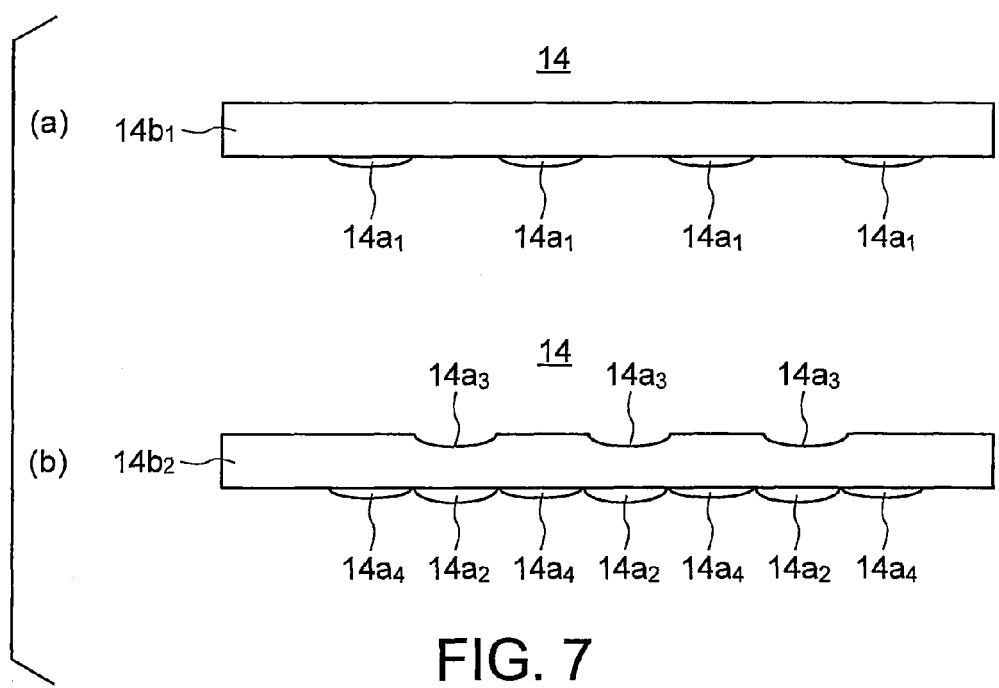
FIGS. 7(a) and 7(b) are diagrams showing a fourth specific example of the microlens array.

FIG. 7 shows a fourth specific example of the microlens array 14. The microlens array 14 of the fourth specific example includes two or more transparent substrates $14b_1$, $14b_2$ arranged in parallel. A group of convex microlenses $14a_1$ are arranged on a surface of the substrate $14b_1$ on the side where an imaging element, not shown, is located, and a group of convex microlenses $14a_2$ are arranged on a surface of the substrate $14b_2$ on the side where the imaging element is located. The microlenses $14a_1$ are spaced apart from each other on the substrate $14b_1$, and the microlenses $14a_2$ are spaced apart from each other on the substrate $14b_2$. Another group of concave microlenses $14a_3$ is arranged on the other surface of the substrate $14b_2$, which surface is opposite to the surface on which the group of microlenses $14a_2$ is arranged. The microlenses $14a_3$ are located at positions corresponding to the positions of the microlenses $14a_2$. Each convex microlens $14a_2$ is combined with a corresponding concave microlens $14a_3$ to form one microlens having a shorter focal length. A further group of microlenses $14a_4$ is arranged on the substrate $14b_2$. The microlenses $14a_4$ and the microlenses $14a_2$ are alternately arranged. The microlenses $14a_4$ are located at positions corresponding to the microlenses $14a_1$, and the two corresponding microlenses $14a_4$ and $14a_1$ have a common optical axis. Each convex microlens $14a_1$ is combined with a corresponding convex microlens $14a_4$ to form one microlens having a longer focal length. The substrate $14b_1$ and the group of microlenses $14a_1$ constitute a first microlens sub-array, and the substrate $14b_2$ and the groups of microlenses $14a_2$, $14a_3$, $14a_4$ constitute a second microlens sub-array.

As in the case of the first specific example, the groups of microlenses $14a_1$, $14a_4$ to provide a longer focal length of the microlens array 14 of the fourth specific example form images on the same imaging plane (not shown) as the groups of microlenses $14a_2$, $14a_3$ to provide a shorter focal length.

Fifth Specific Example

Figure 8:
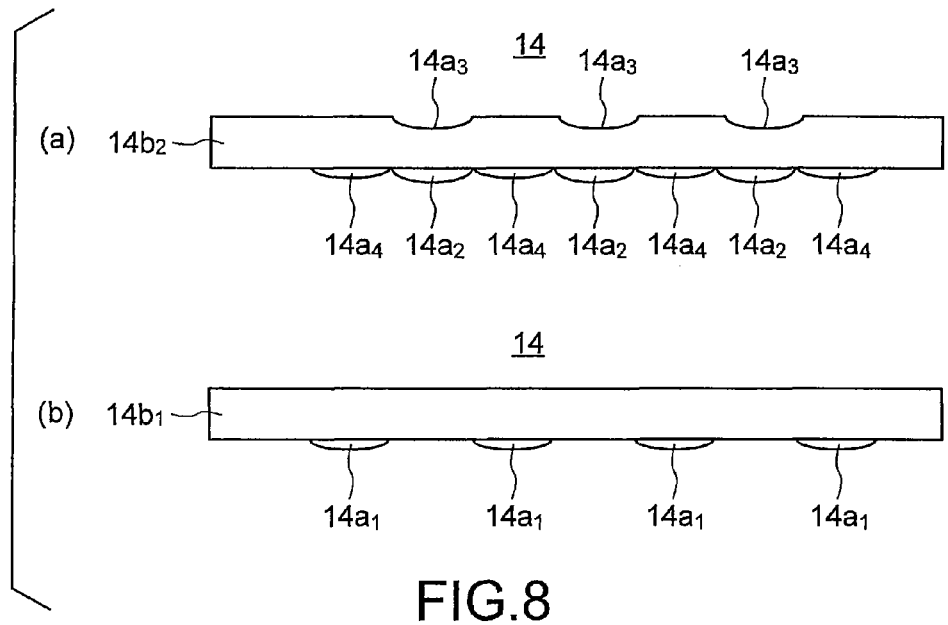
FIGS. 8(a) and 8(b) are diagrams showing a fifth specific example of the microlens array.

FIG. 8 shows a fifth specific example of the microlens array 14. The microlens array of the fifth specific example is obtained by reversing the order of the first microlens sub-array including the substrate $14b_1$ and the group of microlenses $14a_1$ and the second microlens sub-array including the substrate $14b_2$ and the groups of microlenses $14a_2$, $14a_3$, $14a_4$ in the microlens array of the fourth specific example shown in FIG. 7. As a result, the first microlens sub-array is located on the side closer to the imaging element that is not shown, and the second microlens sub-array is located on the side more distant from the imaging element. In the fifth specific example, the groups of microlenses $14a_1$, $14a_4$ have a shorter focal length, and the groups of microlenses $14a_2$, $14a_3$ have a longer focal length.

As in the case of the first specific example, the groups of microlenses $14a_1$, $14a_4$ to provide a shorter focal length of the microlens array 14 of the fifth specific example form images on the same imaging plane (not shown) as the groups of microlenses $14a_2$, $14a_3$ to provide a longer focal length.

Sixth Specific Example

Figure 9:
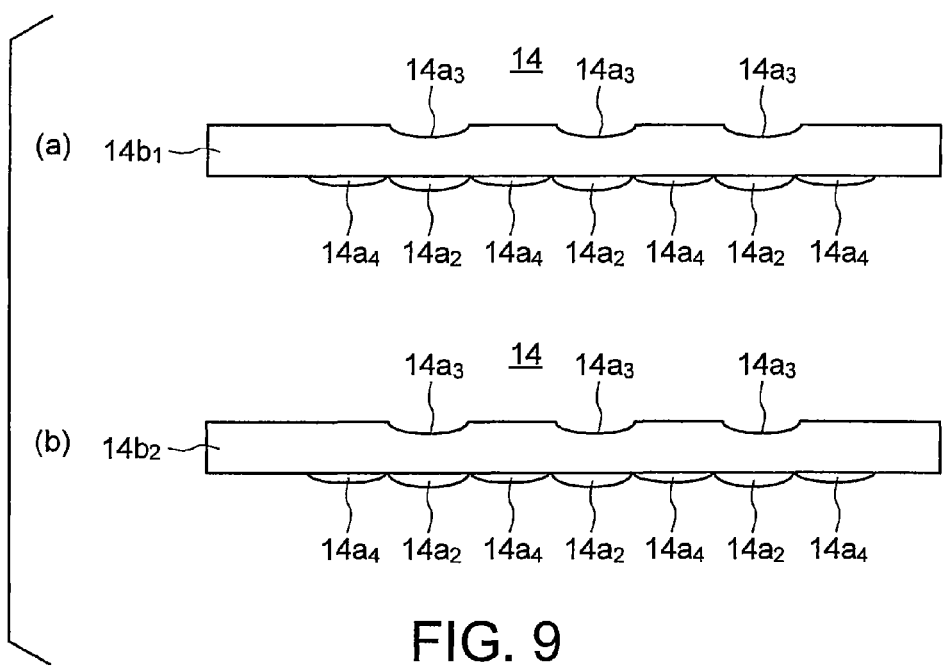
FIGS. 9(a) and 9(b) are diagrams showing a sixth specific example of the microlens array.

FIG. 9 shows a sixth specific example of the microlens array. The microlens array 14 of the sixth specific example has a first microlens sub-array and a second microlens sub-array that have the same structure as the second microlens sub-array of the fourth specific example shown in FIG. 7. The first microlens sub-array is located to be more distant from an imaging element that is not shown, and the second microlens sub-array is located to be closer to the imaging element. In the sixth specific example, the group of microlenses $14a_4$ of the first microlens sub-array and the group of microlenses $14a_4$ of the second microlens sub-array provide one of a shorter focal length and a longer focal length, and the groups of microlenses $14a_2$, $14a_3$ of the first microlens sub-array and the groups of microlenses $14a_2$, $14a_3$ of the second microlens sub-array provide the other.

As in the case of the first specific example, the group of microlenses $14a_4$ of the first microlens sub-array and the group of microlenses $14a_4$ of the second microlens sub-array form images on the same imaging plane (not shown) as the groups of microlenses $14a_2$, $14a_3$ of the first microlens sub-array and the groups of microlenses $14a_2$, $14a_3$ of the second microlens sub-array.

Incidentally, all the microlenses of the first to the sixth specific examples have the same effective f-number in order to prevent the overlapping of images.

Figure 10:
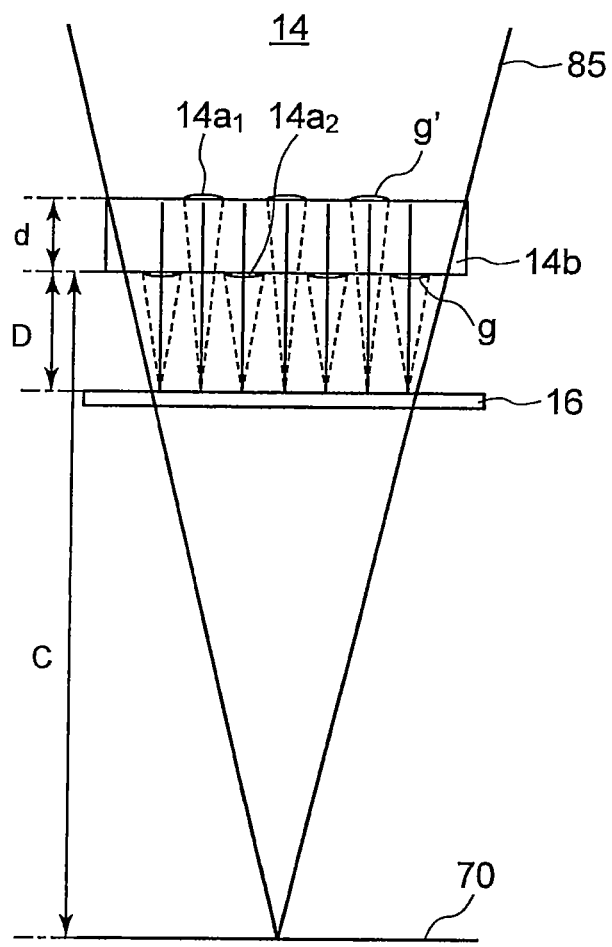
FIG. 10 is a diagram showing an optical system using the microlens array of the first specific example.
Figure 11:
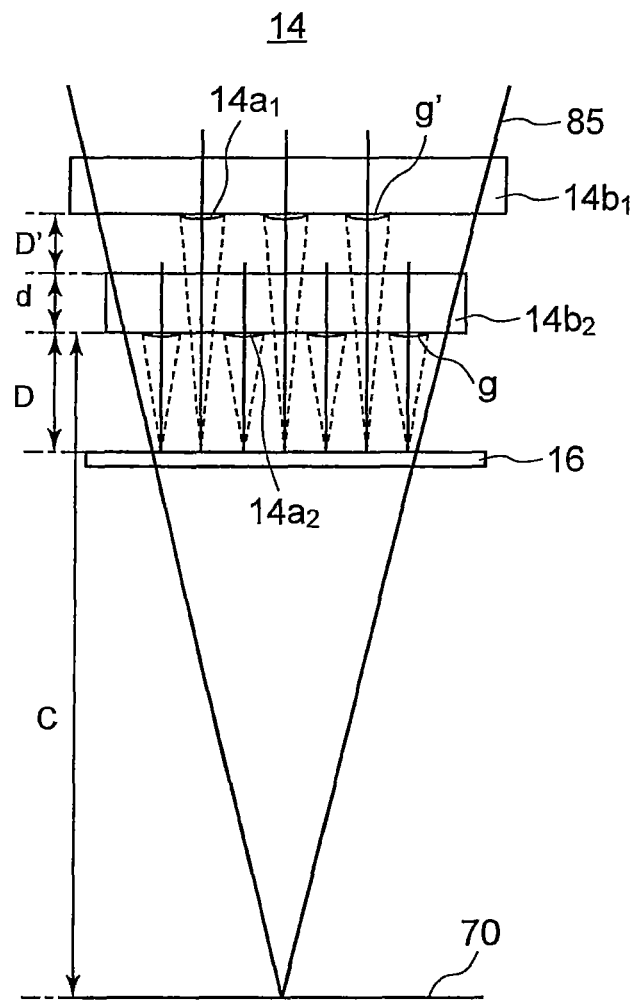
FIG. 11 is a diagram showing an optical system using the microlens array of the third specific example.

Next, the positional relationship between the shorter-focal-length microlenses and the longer-focal-length microlenses in the microlens array 14 will be described in detail with reference to FIGS. 10 and 11. FIG. 10 is a diagram showing an optical system using the microlens array 14 of the first specific example shown in FIG. 4. The reference numeral 85 in FIG. 10 denotes light rays from an imaging lens. Hereinafter, g denotes the focal length of the shorter-focal-length microlenses $14a_2$, g' denotes the focal length of the longer-focal-length microlenses $14a_1$, d denotes the thickness of the substrate $14b$ of the microlens array 14, n denotes the refractive index, C denotes the distance between the shorter-focal-length microlenses $14a_2$ and the imaging plane 70 of the imaging lens that is not shown in FIG. 10, and D denotes the distance between the shorter-focal-length microlenses $14a_2$ and the imaging element 16. In order to locate the imaging plane of the shorter-focal-length microlenses $14a_2$ and the imaging plane of the longer-focal-length microlenses $14a_1$ at a position near the imaging element 16, the following expressions (1) and (2) should hold.

$$-\frac{1}{C} + \frac{1}{D} = \frac{1}{g} \qquad (1)$$

$$-\frac{1}{C+nd} + \frac{1}{D+nd} = \frac{1}{g'} \qquad (2)$$

The case where the microlens array 14 includes two or more microlens sub-arrays will be described with reference to FIG. 11, which is a diagram showing an optical system using the microlens array 14 of the third specific example shown in FIG. 6. The reference numeral 85 in FIG. 11 denotes light rays from an imaging lens, and D' denotes the distance between the first microlens sub-array and the second microlens sub-array. The following expression (2') should hold for the microlens array of the third specific example, instead of the expression (2) for the microlens array of the first specific example.

$$-\frac{1}{C+nd+D'} + \frac{1}{D+nd+D'} = \frac{1}{g'} \qquad (2')$$

Figure 12:
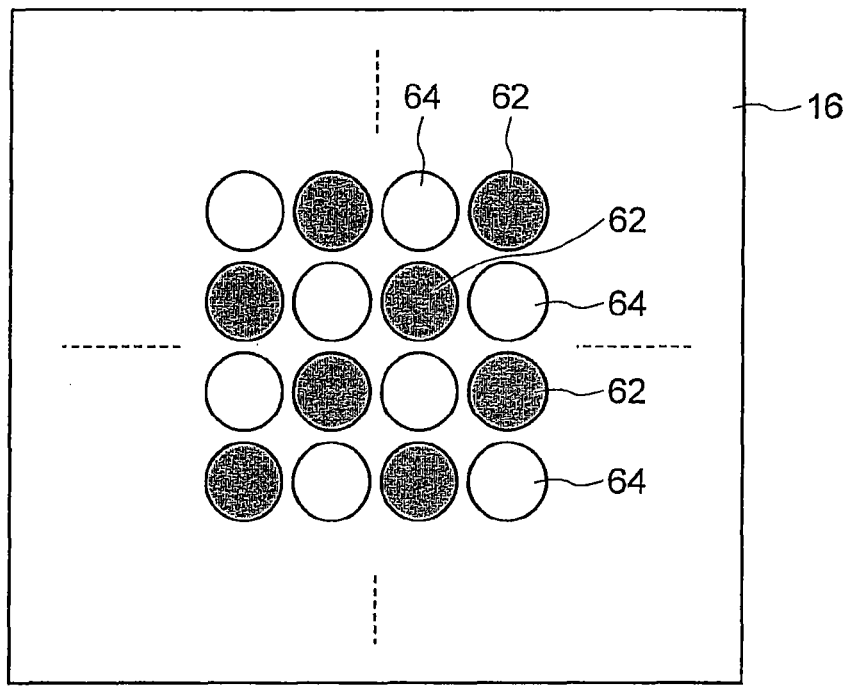
FIG. 12 is a diagram showing microlens images obtained by an imaging element when a microlens array of a square arrangement is used.
Figure 13:
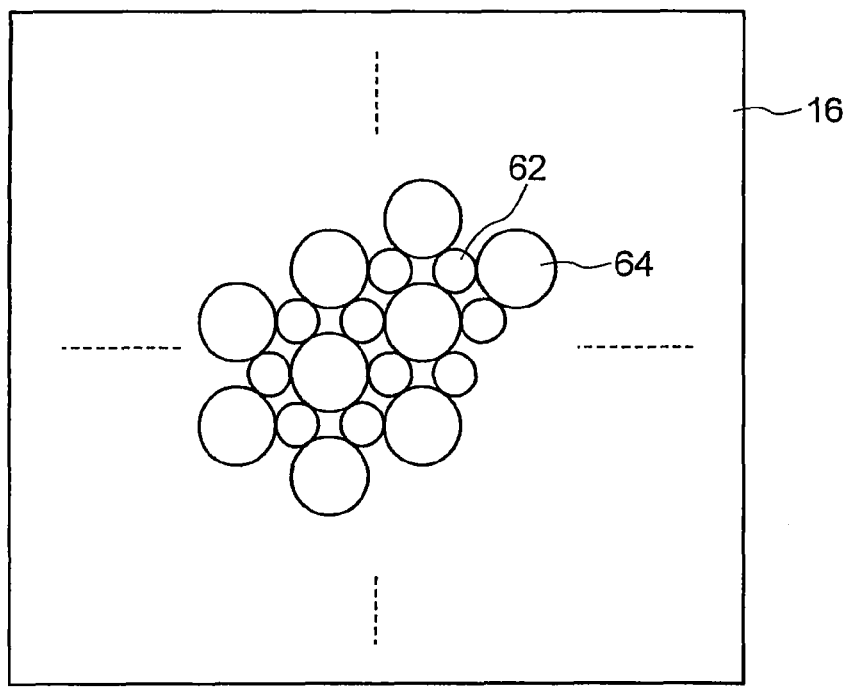
FIG. 13 is a diagram showing microlens images obtained by an imaging element when a microlens array of a hexagonal arrangement is used.

Next, microlens images obtained by the imaging element 16 will be described with reference to FIG. 12. An example of a square-arrangement microlens array will be described below. When the microlens array 14 is viewed from the front side where a subject is present, shorter-focal-length microlenses and longer-focal-length microlenses are arranged so as not to overlap spatially. As a result, shorter-focal-length microlens images 62 and longer-focal-length microlens images 64 do not overlap each other, as shown in FIG. 12. This can also be said for a microlens array in a hexagonal arrangement, for example. FIG. 13 shows such a case, in which shorter-focal-length microlens images 62 and longer-focal-length microlens images 64 do not overlap each other.

Next, a method of producing the microlens array 14 of this embodiment will be described with reference to FIGS. 14(a) to 14(c). Although the microlens array 14 can be produced in various ways, an example of a method using embossing will be described. The microlens array 14 produced by this method is that of the first specific example shown in FIG. 4.

First, a transparent substrate 14b of, for example, glass, and molds $52_1$, $52_2$ for forming microlenses are prepared. The molds $52_1$, $52_2$ each have depressions corresponding to the convex microlenses $14a_1$, $14a_2$ (FIG. 14(a)).

A resin 14a is applied to both the sides of the substrate 14b, and the molds $52_1$, $52_2$ are pressed to the resin 14a. As a result, the resin 14a is shaped to form the microlenses $14a_1$, $14a_2$ (FIG. 14(b)).

Figure 14:
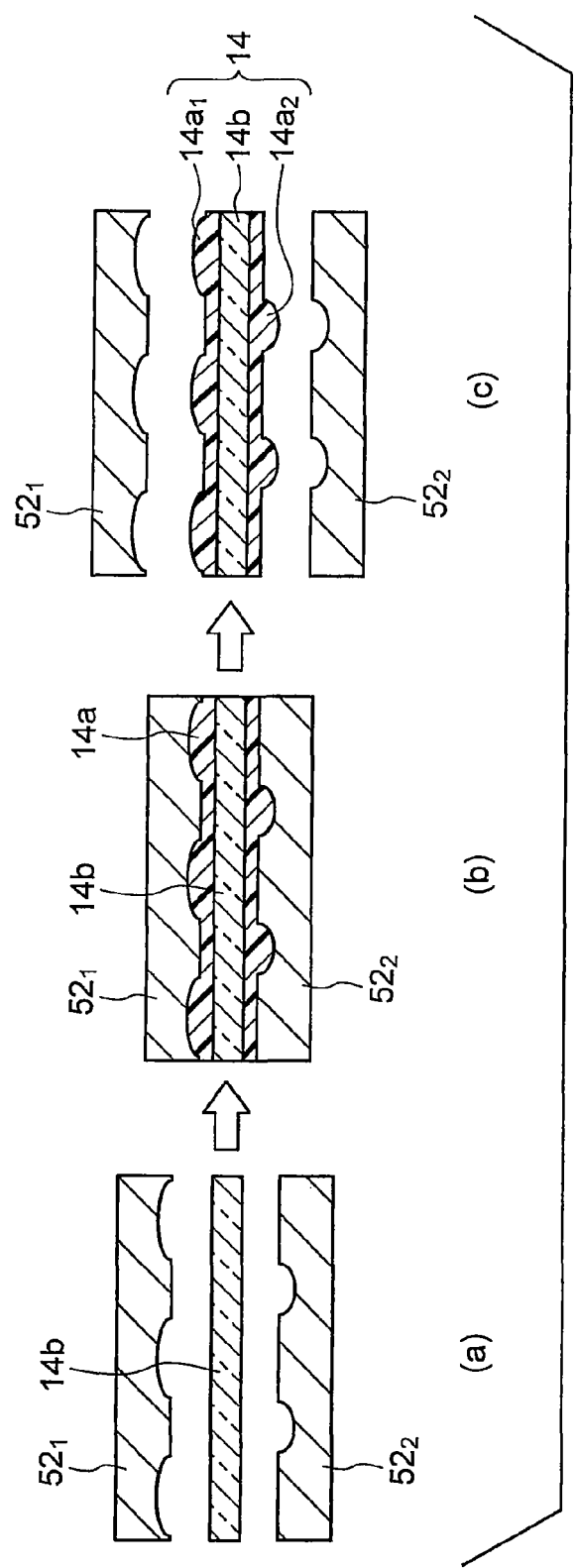
FIGS. 14(a) to 14(c) are cross-sectional views for explaining a method of producing a microlens array.

The molds $52_1$, $52_2$ are then separated from the resin 14a to form the microlens array 14 (FIG. 14(c)).

If the positions of the molds $52_1$, $52_2$ are determined in advance in such a production method, the microlens array 14 can be formed with a higher positioning accuracy, and the number of steps of producing the microlens array can be reduced.

(Method of Obtaining Two Images Having Different Reconstruction Magnifications)

Next, a method for obtaining two images having different reconstruction magnifications will be described, taking the optical system shown in FIG. 2 as an example. The following expression (3) holds for this optical system:

$$\frac{1}{A} + \frac{1}{B} = \frac{1}{f} \quad (3)$$

where A denotes the distance between the subject 100 and the imaging optics (imaging lens) 12, B denotes the distance between the imaging lens 12 and the imaging plane 70, and f denotes the focal length of the imaging lens 12. When the distance A between the imaging lens 12 and the subject 100 changes, the value of the distance B between the imaging lens 12 and the imaging plane 70 also changes according to the expression (3). It is assumed in this embodiment that the distance E between the imaging lens 12 and the microlens array 14 is fixed. The equation E=B+0.0 can be derived from the positional relationship in the optical system. Since E is a fixed value, a change in the value of B changes leads to a change in the value of C. It can be understood from the following expression (4) relating to microlenses the change in the value of C further leads to a change in the value of D.

$$\frac{1}{C} + \frac{1}{D} = \frac{1}{g} \quad (4)$$

As a result, a virtual image formed on the imaging plane 70 by the imaging lens 12 is reduced by each microlens by the magnification N (N=D/C), which is further expressed by the following expression (5):

$$N = \frac{D}{C} = \frac{D}{E-B} = \frac{\frac{Cg}{C-g}}{E - \frac{Af}{A-f}} = \frac{Cg(A-f)}{(C-g)\{E(A-f)-Af\}} \quad (5)$$

It can be understood from the expression (5) that the reduction rate of each microlens image is dependent on the distance A to the subject 100. Therefore, in order to reconstruct the original two-dimensional image, the microlens images are enlarged by 1/N times, caused to overlap, and combined. In this manner, a reconstructed image that is in focus on the distance A can be obtained. In overlapping, images are slightly shifted from each other for the portions other than the portion in focus on the distance A, which brings about a kind of "blur" effect.

Such an operation to adjust the focus of an image obtained from captured microlens images to an arbitrarily selected position is called "refocusing." If the reconstruction magnification greatly changes depending on the distance A to the subject, an image including heavy blur between subjects with different distances (refocused image) is obtained. On the contrary, if the variation in reconstruction magnification is slight for the distance A to the subject, an image with slight blur between subjects with different distances (deep focus image) is obtained.

The expression (6) can be obtained by transforming the expression (5). As is clear from the expression (6), the reconstruction magnification 1/N is inversely proportional to the focal length g of the microlenses.

$$\frac{1}{N} = 1 + \frac{1}{g}\left(\frac{Af}{A-f} - E\right) \quad (6)$$

Figure 15:
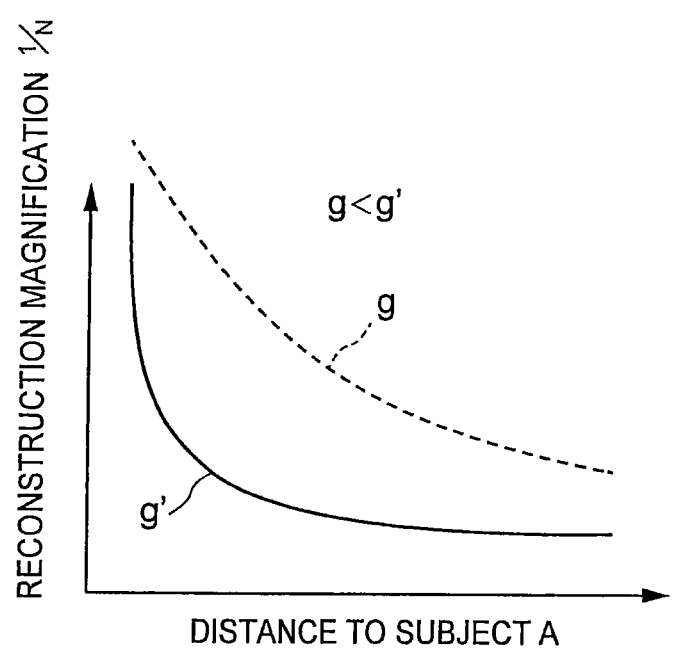
FIG. 15 is a diagram showing the relationship between the distance to the subject and the reconstruction magnification.

Accordingly, the relationship between the distance A to the subject and the reconstruction magnification 1/N varies depending on the values of the focal length g, g' of the microlenses, as shown in FIG. 15. From this, whether an optical system obtains a refocused image or a deep focus image can be selected by adjusting the value of the focal length g of the microlenses.

(Methods for Obtaining Deep Focus Image and Refocused Image)

Next, methods for obtaining a deep focus image and a refocused image will be described below.

First, a method for obtaining a deep focus image will be described. It is assumed here that the microlens array 14 of the optical system includes two types of microlenses, longer-focal-length microlenses and shorter-focal-length microlenses. In this case, an image reconstructed from longer-focal-length microlens images represented by the g' graph in FIG. 15 becomes a deep focus image, in which the in-focus area is wide.

Figure 16:
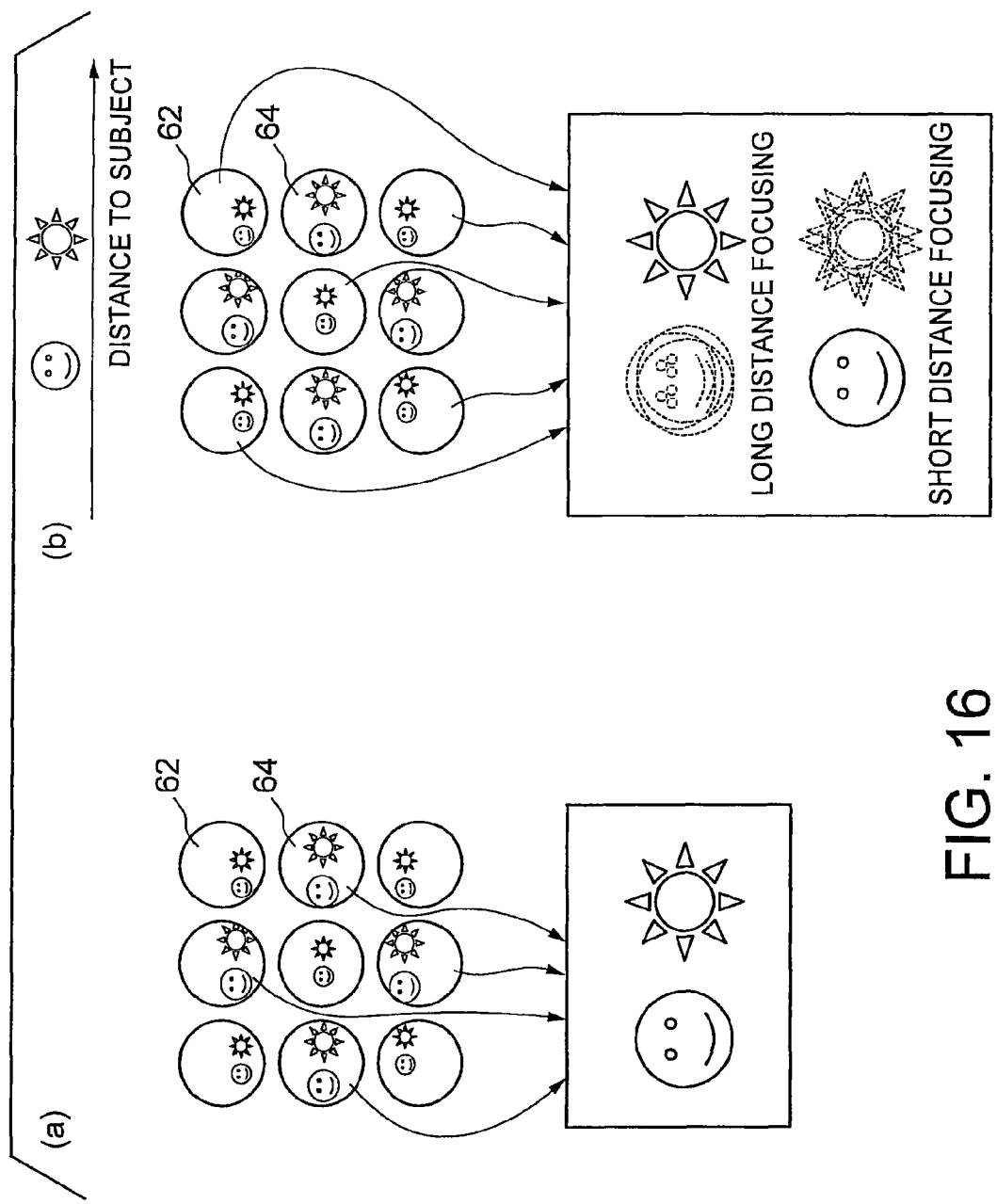
FIGS. 16(a) and 16(b) are diagrams for explaining a method for obtaining a deep focus image and a method for obtaining a refocused image, respectively.

In contrast, an image reconstructed from shorter-focal-length microlens images becomes a refocused image since the variation in reconstruction magnification 1/N with respect to the distance A to the subject is great. The deep focus image can be obtained by causing the longer-focal-length microlens images 64 to overlap each other as shown in FIG. 16(a). The refocused image can be obtained by causing the shorter-focal-length microlenses images 62 to overlap each other as shown in FIG. 16(b). The in-focus position of a refocused image can be arbitrarily determined by changing the reconstruction magnification.

Figure 17:
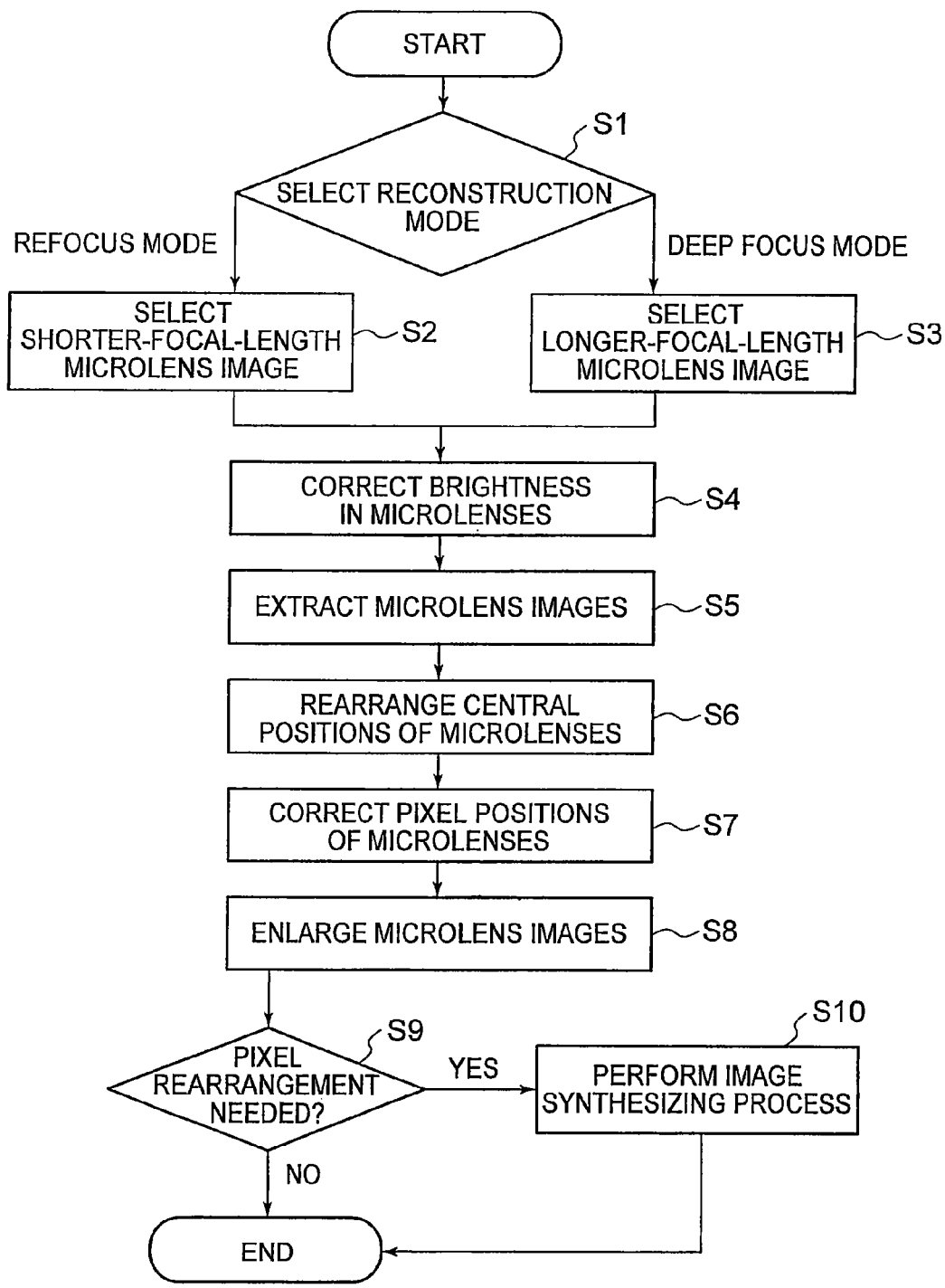
FIG. 17 is a flow chart showing the procedure of an image reconstruction process for obtaining a deep focus image or refocused image.

FIG. 17 shows the procedure of an image reconstruction process for obtaining a deep focus image or refocused image. The reconstruction process is performed by an image reconstruction unit that is not shown. First, a selection unit of the image reconstruction unit (not shown) selects a reconstruction mode, i.e., either a deep focus mode or refocus mode (step S1). When the refocus mode is selected, the process proceeds to step S2 to select the shorter-focal-length microlenses. When the deep focus mode is selected, the process proceeds to step S3 to select the longer-focal-length microlenses.

Next, the brightness of the microlenses is corrected by a known method, e.g., the method disclosed in JP 2012-186764 A (step S4). Thereafter, the microlens images are extracted (step S5). In the extraction operation, the region of interest (ROI) such as a circular region having its center at the central coordinate of the microlens images is set, and the pixel value data within the region are stored in a memory or the like. The central coordinate of the microlens images used for the extraction operation is pre-stored in the memory. The central coordinate data of the microlens images can be obtained by capturing a calibration image of such a subject as a white planar light source, and using a binarization process and a contour fitting process.

Subsequently, the central positions of the microlenses are rearranged and the microlens pixel positions are corrected using a known method, e.g., the method disclosed in JP 2012-186764 A (steps S6 and S7).

Thereafter, the microlens images are enlarged (step S8). An enlarged macrolens image is generated by performing an interpolation method such as the bilinear method and the bicubic method on the ROI pixel value data stored in the memory. Subsequently, the pixels are rearranged by using a known method, e.g., the method disclosed in JP 2012-186764 A. Then, whether there is a region in which microlens images are overlapping or not is determined with respect to the rearranged pixels (step S9). If there is no overlapping region, the process ends. If there is an overlapping region, the process proceeds to step S10 to synthesize an image, and ends.

(Method for Obtaining Distance to Subject)

Next, a method for obtaining the distance to a subject will be described.

As mentioned above regarding the expression (5), when the distance A to the subject 100 changes in the optical system shown in FIG. 2, the values B, C, and D also change, and the reduction magnification N of the microlens images changes. If the expression (5) is solved for the distance A, $$A = \frac{(D-NE)f}{D-NE+Nf} \quad (7)$$

can be obtained. Thus, if the reduction magnification N of the microlenses is calculated based on such a method by means of image matching, and if the values of D, E, and f are known, the value of A can be calculated backward from the expression (7).

In the optical system shown in FIG. 3, E+C=B, and the following expression (8) further shows a lens expression regarding microlenses.

$$-\frac{1}{C} + \frac{1}{D} = \frac{1}{g} \quad (8)$$

Therefore, in this case, the relationship between A and N can be expressed by the expression (9):

$$A = \frac{(D+NE)f}{D+NE-Nf} \quad (9)$$

The reduction magnification N can be expressed as follows from the geometric relationship among light rays, where Δ' denotes the image shift amount between microlenses, and L denotes the distance between the centers of microlenses.

$$N = \frac{\Delta'}{L}$$

Therefore, in order to obtain the reduction magnification N, the image shift amount between microlenses is obtained by image matching using such evaluation values as the sum of squared difference and the sum of absolute difference. In this method, the image shift amount for the microlens images with the same focal length can be obtained using a common image matching method. The image shift amount for the microlens images with different focal lengths can also be obtained using a similar image matching method by correcting the reduction rates of the images and enlarging the microlens images using a known method.

(Optical System Combined with Polarizing Plates)

Figure 18:
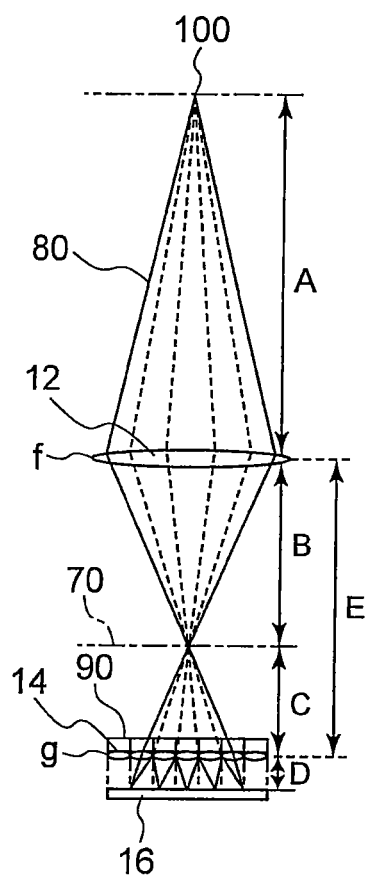
FIG. 18 is a diagram for explaining an optical system combined with a polarizing plate.
Figure 19:
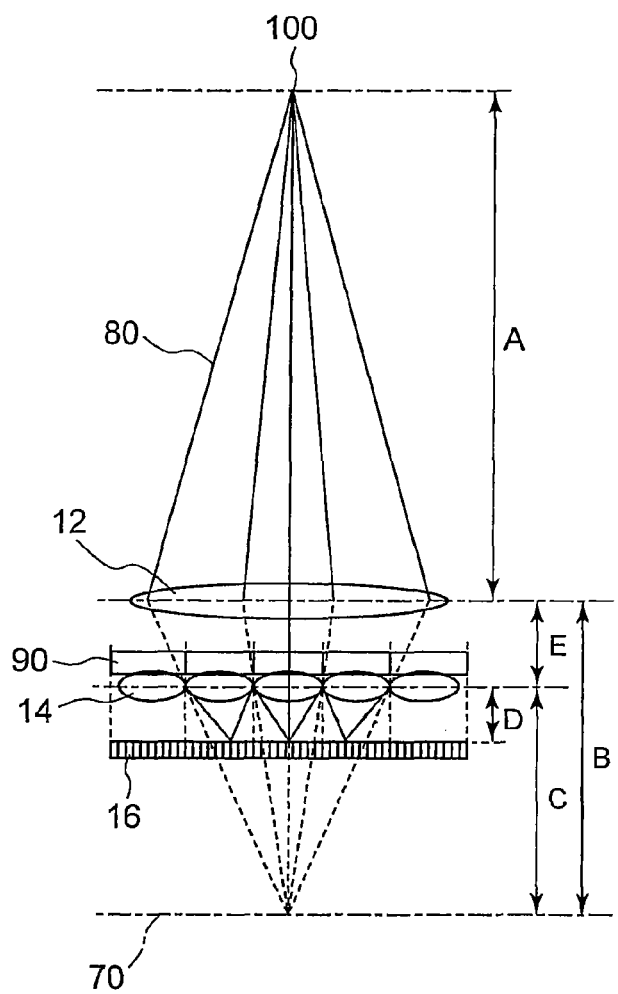
FIG. 19 is a diagram for explaining an optical system combined with a polarizing plate.

Next, an optical system combined with polarizing plates will be described in detail. FIGS. 18 and 19 show optical systems, each including a polarizing plate array 90, corresponding to those shown in FIGS. 2 and 3. Light rays 80 are incident on an imaging lens 12, the polarizing plate array 90, a microlens array 14, and an imaging element 16 in this order. The order of the microlens array 14 and the polarizing plate array 90 can be reversed.

Figure 20:
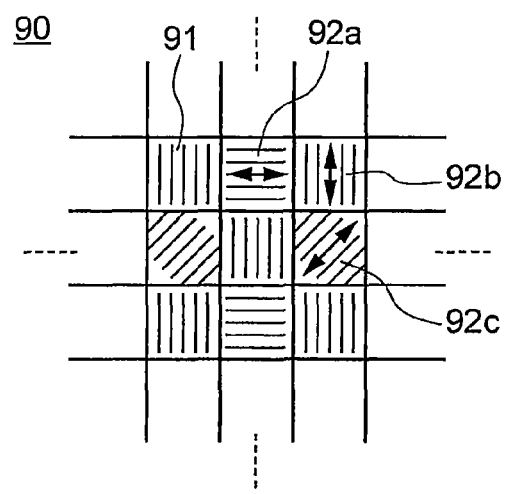
FIG. 20 is a diagram showing an example of polarizing plate.

The polarizing plate array 90 is used for obtaining information on polarization direction, which may differ for each microlens image. The polarizing plate array 90 includes polarizing plates 91 arranged in an array form as shown in FIG. 20, each polarizing plate 91 corresponding to one of the microlenses of the microlens array. The light rays passing through the respective polarizing plates 91 are incident on corresponding microlenses. The polarizing axes of the polarizing plates 91 shown in FIG. 20 are in three directions, 92a, 92b, 92c. The polarizing axes 92a, 92b, 92c extend in the horizontal direction, the vertical direction, and an orthogonal direction in FIG. 20. The polarizing axes shown in FIG. 20 are just examples, and the polarizing axes to be used in this embodiment are not limited thereto. If the polarization main axis should be measured with high accuracy, a polarizing plate array including polarizing plates with polarizing axes extending in more directions is used.

The polarizing plate array 90 shown in each of FIGS. 18 and 19 is arranged above the microlenses, but the polarizing plate array of this embodiment is not limited to this arrangement. For example, the polarizing plate array 90 may be placed in midair by a fixing device not shown, or placed above the pixels of the imaging element 16.

(Method for Obtaining Images with Polarization Angles)

Figure 21:
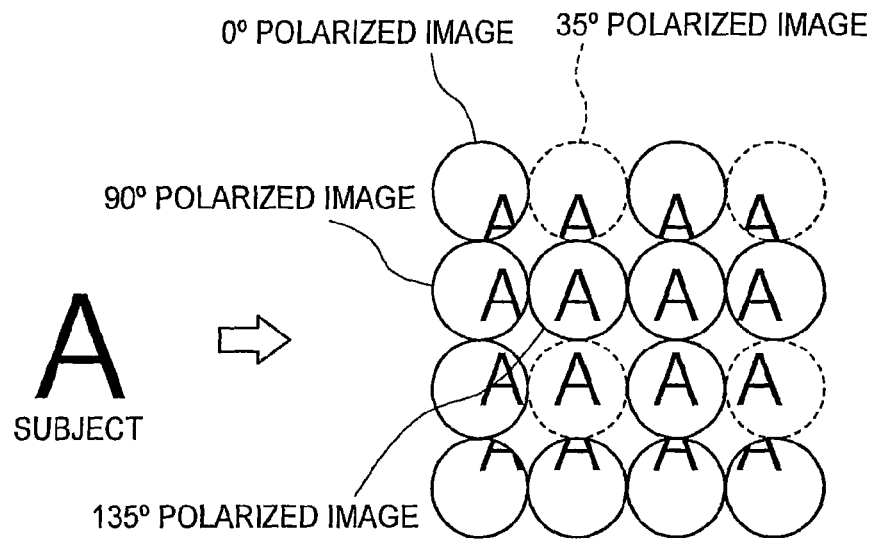
FIG. 21 is a diagram showing a two-dimensional image obtained by a sensor by means of a polarizing plate array.
Figure 22:
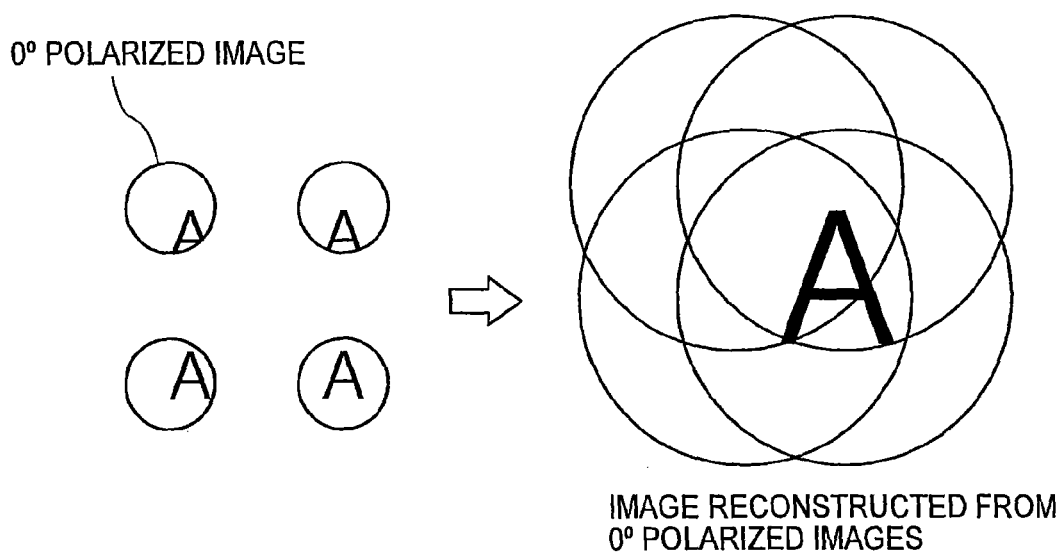
FIG. 22 is a diagram showing an example of image reconstruction using 0° polarizing-axis microlens images.

Next, a method for obtaining images with polarization angles will be described. FIG. 21 shows an example of two-dimensional images obtained by a sensor using a polarizing plate array including four types of polarizing plates with polarizing axes of 0°, 45°, 90°, and 135°. The image of the subject is reduced by each microlens, and the microlens images thus obtained have overlapping portions. A two-dimensional reconstructed image regarding a specific polarizing axis can be obtained by enlarging the microlens images formed through the polarizing plates 91 with that specific polarizing axis. FIG. 22 shows an example of image reconstruction using microlens images formed by using the polarizing plates 90 with the polarizing axis of 0°. Two-dimensional image information representing the polarization intensity of the 0°, 45°, 90°, and 135° polarizing axes can be obtained by such a synthesizing process.

(Method of Calculating Polarization Information from Captured Image)

Figure 23:
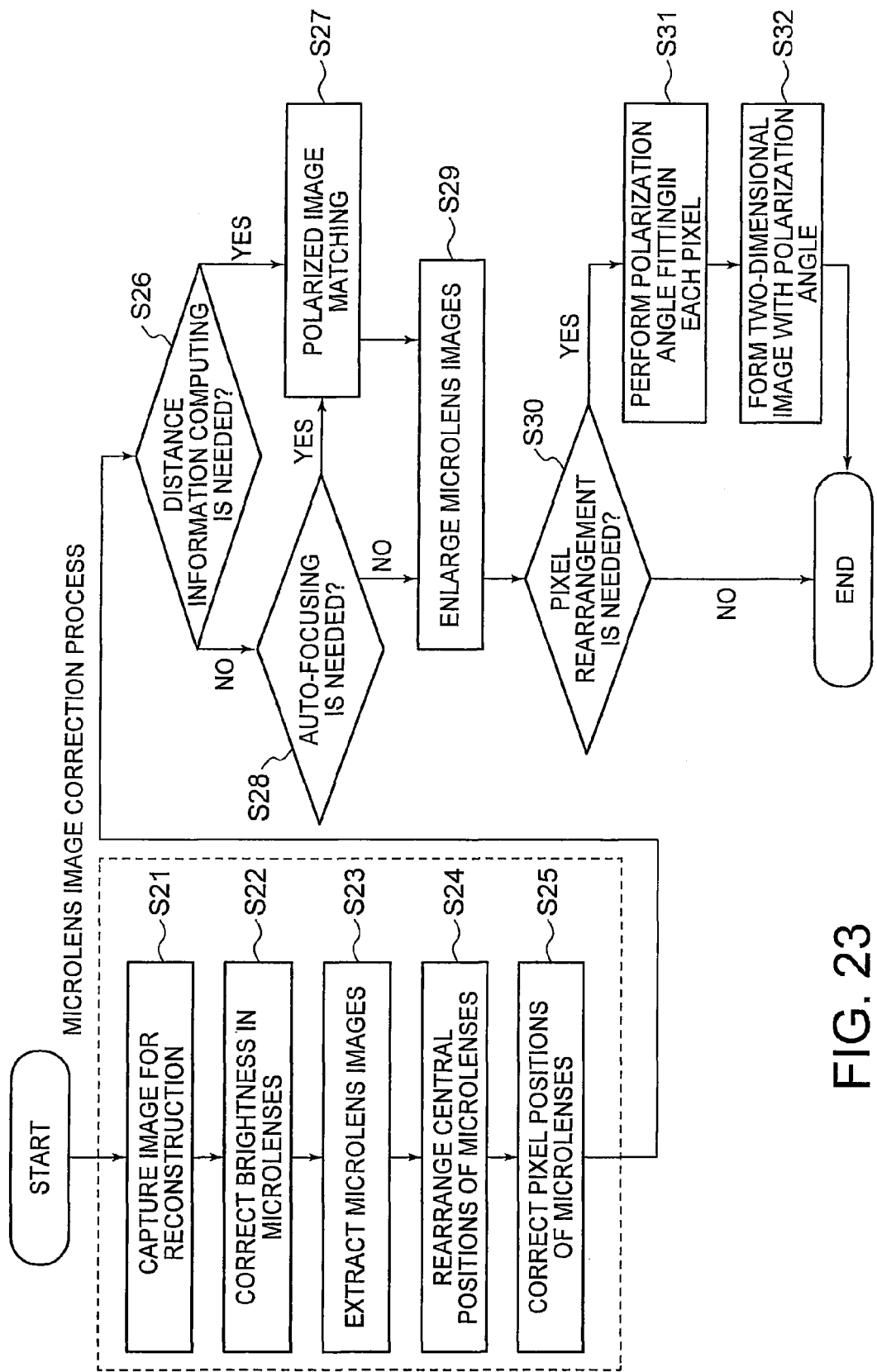
FIG. 23 is a flow chart showing the procedure from image capturing to polarization-information acquiring and distance-information computing.

Next, a method of calculating polarization information from captured images will be described. FIG. 23 shows the procedure of capturing images, acquiring polarization information, and computing distance information. Images to be reconstructed are captured, and the brightness of the microlenses is corrected (step S21, S22). Microlens images are extracted from image data, the brightness of which has been corrected, and then the central positions of the microlenses are rearranged (step S23, S24). Thereafter, the pixel positions of the microlenses are corrected, by which the microlens image correction is finished (step S25).

Then, whether the distance information should be computed or not is determined (step S26). If the distance information computing is performed, polarized image matching, which will be described later, is performed (step S27). If the distance information computing is not performed, the process proceeds to step S28, and whether auto-focusing has been performed or not. If the auto-focusing has been performed, the process proceeds to step S27, and the polarized image matching is performed. If the auto-focusing has not been performed, the process proceeds to step S29, and the microlens images are enlarged. After the polarized image matching is performed at step S27, the process also proceeds to step S29, and the microlens images are enlarged.

Thereafter, whether there is an overlapping portion in the enlarged microlens images or not is determined; if there is an overlapping portion, the pixels are rearranged, and if not, nothing is performed (step S30). If the pixels have not been rearranged, the process ends. If the pixels have been rearranged, the process proceeds to step S31, and polarization angle fitting is performed on each pixel. Then, a two-dimensional image with polarization angle is formed using pixels having been subjected to the polarization angle fitting (step S32), and the process ends. The two-dimensional image is reconstructed by enlarging the respective microlens images with the central positions thereof being fixed, and adding the overlapping pixel values.

The polarized image matching will be described below. First, see the pixel 66 in the microlens images shown in FIG. 24. The pixel 66 is within a region where four microlens images are overlapping, which shows that the same point in the subject is focused on several microlens images. The reason for this is that when an image formed by the imaging lens is divided by the microlenses and re-imaged on the imaging plane of the imaging element, the parallaxes of the respective microlenses make a region having a common image in several microlens images.

Figure 25:
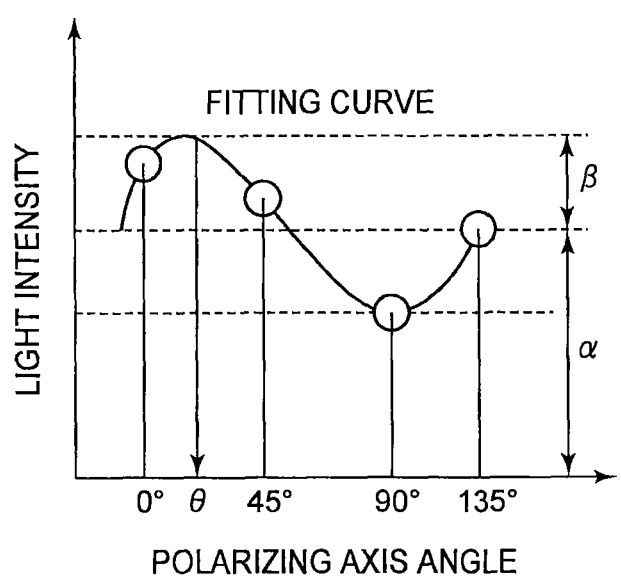
FIG. 25 is a diagram for explaining a method for obtaining a polarization main axis by means of fitting based on the polarizing axis angle and the light intensity.

The light intensity of each microlens image is dependent on the polarizing axis of the corresponding polarizing plate. Accordingly, the intensities of the lights emitted from the same point of the subject and passing through polarizing plates having different polarizing axes can be measured at a time. As an example, it is assumed that the polarizing axes relating to the microlens images overlapping on the pixel 66 are 0°, 45°, 90°, and 135°. The light intensities of the respective polarized microlens images can be obtained from microlens images before the enlarging and synthesizing operation. The polarization main axis θ can be obtained from a polarization curve determined by the fitting based on the polarizing axis angle of the polarizing plate and the light intensity, as shown in FIG. 25. A two-dimensional polarization image can be obtained by a polarization image generating unit (not shown) by computing the polarization main axis for all the computable pixels.

Figure 24:
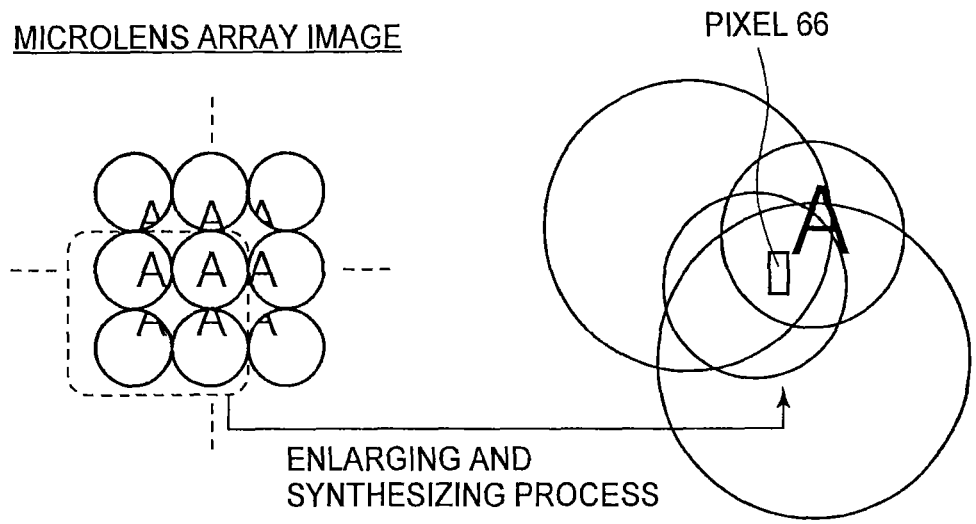
FIG. 24 is a diagram for explaining polarized-image matching.
Figure 26:
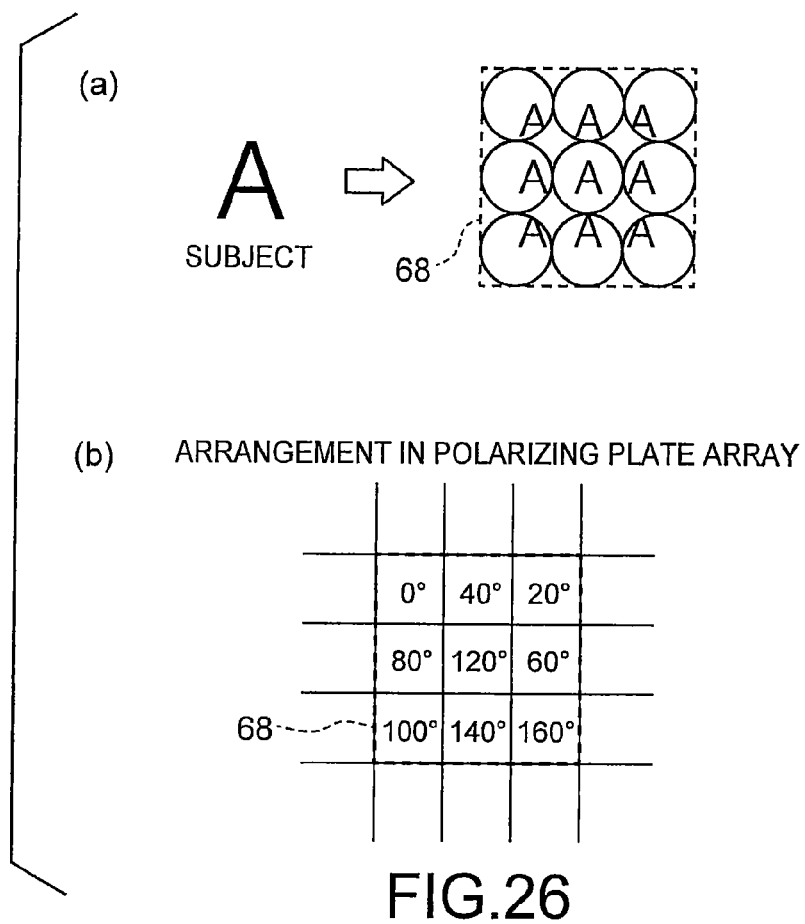
FIGS. 26(a) and 26(b) are diagrams for explaining how to obtain microlens images in which a subject for which the polarization main axis is to be measured is imaged in a number of microlenses.
Figure 27:
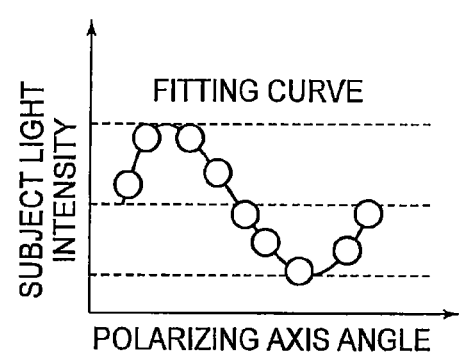
FIG. 27 is a diagram for explaining a method for obtaining the polarization main axis by means of fitting based on the polarizing axis angle and the light intensity.

The polarization main axes relating to FIG. 24 are computed using the polarizing plates with the polarizing axes in four directions. The accuracy of the polarization main axes can be changed by changing the directions of the polarizing axes and the positions of the polarizing plates. For example, when the polarizing plate array having the polarizing axes shown in FIG. 26(*b*) is used, the magnification of each microlens is adjusted to obtain microlens images 68 shown in FIG. 26(*a*), each of which contains the subject for which the polarization main axis is to be computed. In this manner, it is possible to obtain information on light intensities of polarizing axes in several directions. Therefore, the fitting of polarization curve can be performed with more information on light intensities than the case shown in FIG. 25 by employing more polarizing axis angles as shown in FIG. 27. Thus, it is possible to determine the polarization main axis more accurately.

An optical system including microlenses with different focal lengths as in the above optical system may be used in such a manner that a high-resolution two-dimensional image is formed based on polarization information using the longer-focal-length microlens images, and more accurate polarization information is computed using the shorter-focal-length microlenses images. Thus, it is possible to obtain a two-dimensional polarization angle distribution and depth information more accurately.

Figure 28:
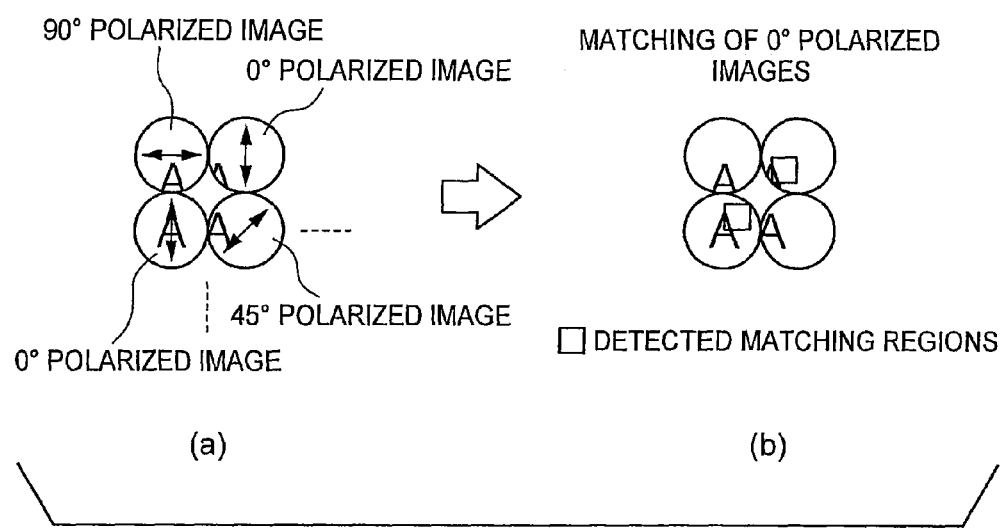
FIGS. 28(a) and 28(b) are diagrams for explaining image matching between 0° polarizing-axis images.

When the distance to a subject is obtained using an optical system combined with a polarizing plate array, microlens images formed by polarizing plates with the same polarizing axis are compared with each other in order to prevent the mismatching caused by comparing images formed by polarizing plates with different polarizing axes. For example, image matching can be performed for images having the 0° polarizing axis as shown in FIGS. 28(*a*) and 28(*b*). Thus, the matching position for the polarized images having the same polarizing axis can be determined in the same manner as regular two-dimensional visible images using such image matching evaluation values as SAD and SSD. After the microlens image shift amount is obtained from the matching position, the distance to the subject can be computed in the same manner as the case of two-dimensional visible images, using the expression (7) or (9).

As described above, according to the first embodiment, it is possible to provide a microlens array unit and a solid state imaging device capable of providing high-resolution images and images with a re-focusing effect.

Second Embodiment

Figure 29:
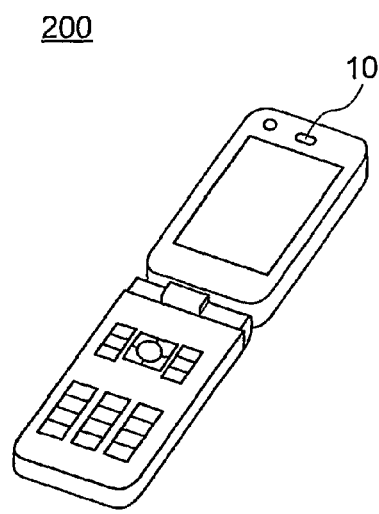
FIG. 29 is a diagram showing a portable information terminal according to a second embodiment.

FIG. 29 shows a portable information terminal according to the second embodiment. The portable information terminal 200 according to the second embodiment includes the solid state imaging device 1 according to the first embodiment. FIG. 29 shows the imaging module unit 10 of the solid state imaging device 1. The portable information terminal shown in FIG. 29 is just an example.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A microlens array unit comprising:
a substrate;
a first group of microlenses including first microlenses having a convex shape and a first focal length, the first group of microlenses being arranged on the substrate; and
a second group of microlenses including second microlenses having a convex shape and a second focal length that is different from the first focal length, the second group of microlenses being arranged on the substrate,
a first imaging plane of the first group of microlenses and a second imaging plane of the second group of microlenses being parallel to each other,
a distance between the first imaging plane and the second imaging plane in a direction perpendicular to the first imaging plane being 20% or less of the first focal length, and
images of the first microlenses projected on the substrate not overlapping images of the second microlenses projected on the substrate.

2. The unit according to claim 1, wherein the substrate includes a first surface and a second surface opposed to each other, the first group of microlenses being arranged on the first surface, and the second group of microlenses being arranged on the second surface.

3. The unit according to claim 1, wherein:
the substrate includes a first surface and a second surface opposed to each other, the first group of microlenses and the second group of microlenses being arranged on the first surface of the substrate; and
the unit further comprises a third group of microlenses including third microlenses each having a concave shape, the third microlenses being located on the second surface at positions corresponding to positions of the second microlenses.

4. A microlens array unit comprising:
a first substrate including a first surface and a second surface opposed to each other;
a second substrate including a third surface and a fourth surface, the third surface facing the second surface of the first substrate;
a first group of microlenses including first microlenses having a convex shape and a first focal length, the first group of microlenses being arranged on the second surface of the first substrate; and
a second group of microlenses including second microlenses having a convex shape and a second focal length that is different from the first focal length, the second group of microlenses being arranged on the fourth surface of the second substrate,
a first imaging plane of the first group of microlenses and a second imaging plane of the second group of microlenses being parallel to each other,
a distance between the first imaging plane and the second imaging plane in a direction perpendicular to the first imaging plane being 20% or less of the first focal length, and the first group of microlenses and the second group of microlenses being arranged in such a manner that images of the first microlenses projected on the second substrate do not overlap images of the second microlenses projected on the second substrate.

5. The unit according to claim 4, further comprising a third group of microlenses including third microlenses each having a concave shape, the third microlenses being located on the third surface of the second substrate at positions corresponding to positions of the second microlenses.

6. The unit according to claim 4, further comprising a fourth group of microlenses including fourth microlenses each having a convex shape, the fourth microlenses being located on the fourth surface of the second substrate at positions corresponding to positions of the first microlenses.

7. The unit according to claim 4, further comprising a fifth microlens group including fifth microlenses each having a convex shape, the fifth microlenses being located on the second surface of the first substrate at positions corresponding to positions of the second microlenses.

8. The unit according to claim 4, further comprising a sixth microlens group including sixth microlenses each having a concave shape, the sixth microlenses being located on the first surface of the first substrate at positions corresponding to positions of the first microlenses.

9. A solid state imaging device comprising:
an imaging optics forming an image of a subject on an imaging plane;
an imaging element facing the imaging optics and including an imaging region having pixel blocks each including pixels; and
the unit according to claim 1 located between the imaging optics and the imaging element.

10. The device according to claim 9, further comprising an image reconstruction unit obtaining microlens images that correspond to the microlenses from image signals outputted from the imaging element, and reconstructing one of a deep focus image and a refocused image.

11. The device according to claim 10, wherein the image reconstruction unit includes a selection unit selecting one of the deep focus image and the refocused image, and an image is formed based on a result of selection performed by the selection unit.

12. The device according to claim 9, further comprising a polarizing plate array including polarizing plates corresponding to the microlenses of the microlens array unit, the polarizing plate array being located between the microlens array unit and the imaging optics or between the microlens array unit and the imaging element.

13. The device according to claim 12, further comprising a two-dimensional polarization image generating unit obtaining polarization information from image signals outputted from the imaging element, and generating a two-dimensional polarization image.

14. A solid state imaging device comprising:
an imaging optics forming an image of a subject on an imaging plane;
an imaging element facing the imaging optics and including pixel blocks each including pixels; and
the unit according to claim 4 located between the imaging optics and the imaging element.

15. The device according to claim 14, further comprising an image reconstruction unit obtaining microlens images corresponding to the microlenses from image signals outputted from the imaging element, and reconstructing one of a deep focus image and a refocused image.

16. The device according to claim 15, wherein the image reconstruction unit includes a selection unit selecting one of the deep focus image and the refocused image, and an image is formed based on a result of selection performed by the selection unit.

17. The device according to claim 14, further comprising a polarizing plate array located between the microlens array unit and the imaging optics or between the microlens array unit and the imaging element, and including polarizing plates corresponding to the microlenses of the microlens array unit.

18. The device according to claim 17, further comprising a two-dimensional polarization image generating unit obtaining polarization information from image signals outputted from the imaging element and generating a two-dimensional polarization image.

* * * * *